United States Patent
Kim et al.

(10) Patent No.: US 7,570,480 B2
(45) Date of Patent: Aug. 4, 2009

(54) TANTALUM CAPACITOR

(75) Inventors: Jae Kwang Kim, Gyunggi-do (KR); Kwan Hyeong Kim, Gyunggi-do (KR)

(73) Assignee: Samsung Electro-Mechanics Co., Ltd., Gyunggi-do (KR)

( * ) Notice: Subject to any disclaimer, the term of this patent is extended or adjusted under 35 U.S.C. 154(b) by 0 days.

(21) Appl. No.: 11/902,993

(22) Filed: Sep. 27, 2007

(65) Prior Publication Data

US 2008/0080124 A1    Apr. 3, 2008

(30) Foreign Application Priority Data

Sep. 28, 2006    (KR) .................. 10-2006-0094960

(51) Int. Cl.
*H01G 4/228* (2006.01)
*H01G 9/04* (2006.01)

(52) U.S. Cl. ...................... 361/540; 361/533

(58) Field of Classification Search ................ 361/523, 361/528–529, 532–533, 540
See application file for complete search history.

(56) References Cited

U.S. PATENT DOCUMENTS 4,734,827 A * 3/1988 Wong .................. 361/529
4,831,490 A 5/1989 Voeten et al.
2008/0106853 A1* 5/2008 Suenaga .................. 361/529

FOREIGN PATENT DOCUMENTS

| KR | 20-0307570 | 3/2003 |
| KR | 10-2004-0054356 A | 6/2004 |
| WO | WO 2006035846 A1 * | 4/2006 |

OTHER PUBLICATIONS

Korean Office Action, with English Translation, issued in Korean Patent Application No. KR 10-2006-0094960, dated May 30, 2008.

* cited by examiner

*Primary Examiner*—Eric Thomas
(74) *Attorney, Agent, or Firm*—McDermott Will & Emery LLP

(57) ABSTRACT

A tantalum capacitor including: a capacitor body containing a tantalum powder and having a mounting surface; a cathode lead frame having the capacitor body mounted thereon; a tantalum wire having an insertion portion located inside the capacitor body and a non-insertion portion located outside the capacitor body; an anode lead frame connected to the non-insertion portion of the tantalum wire; and a resin mold surrounding the capacitor body and the tantalum wire, wherein the insertion portion of the tantalum wire has at least one bending.

13 Claims, 3 Drawing Sheets

TANTALUM CAPACITOR

CROSS-REFERENCE TO RELATED APPLICATIONS

This application claims the priority of Korean Patent Application No. 2006-94960 filed on Sep. 28, 2006, in the Korean Intellectual Property Office, the disclosure of which is incorporated herein by reference.

BACKGROUND OF THE INVENTION

1. Field of the Invention

The present invention relates to a tantalum capacitor, more particularly, in which a capacitor body has a greater usable area and a tantalum wire is disposed to achieve miniaturization of the tantalum capacitor.

2. Description of the Related Art

Tantalum Ta carries mechanical and physical properties such as high melting point, and superior ductility and corrosion resistance, thus widely utilized across the industry, including electrics and electronics, mechanics, chemistry, medicine, space and military field. Notably, of all metals, tantalum allows formation of a most stable anode oxidized film, thus broadly used as a material for an anode in a small capacitor. Moreover, tantalum has been drastically increased in use by 10% annually due to rapid development of IT industry such as electronics and telecommunication.

Generally, a capacitor is an electrical device that can store energy temporarily. In the capacitor, two conductive plate electrodes are closely spaced with each other, separated by a dielectric, and electric charges build up on each plate electrode. That is, the capacitor is used to obtain capacitance by storing electrical charges between the two conductors.

A tantalum capacitor utilizes pores generated when a tantalum powder is sintered and cured. For this tantalum capacitor, an oxidized tantalum $Ta_2O_5$ is formed by anode oxidization on a surface of tantalum which acts as an electrode metal. Then, a manganese dioxide $MnO_2$ layer is formed as an electrolyte on the oxidized tantalum which serves as a dielectric. Also, a graphite layer is formed on the manganese dioxide $MnO_2$ layer, and a metal layer is formed on the graphite layer to derive a cathode electrode.

FIGS. 1A and 1B are a front view and a plan view illustrating an internal structure of a conventional tantalum capacitor, respectively.

Referring to FIGS. 1A and 1B, the conventional tantalum capacitor includes a rectangular parallelepiped capacitor body 11 containing tantalum powder, a tantalum wire 13 partially inserted into the capacitor body, a cathode lead frame 12, a cathode lead frame 12 connected to the capacitor body 11 and an anode lead frame 14 connected to the tantalum wire 13.

The tantalum wire 13 is bent twice perpendicularly at a portion not inserted into the capacitor body 11. Such bending allows the tantalum wire 13 to be directly connected to the anode lead frame 14.

Carbon and silver are applied on the capacitor body 11 and the cathode lead frame 14 is connected to the capacitor body 11 by a silver adhesive 12a. The tantalum wire 13 may be bonded to the anode lead frame 14 by one of spot welding, a conductive paste and laser welding.

In this tantalum capacitor structured as above, a larger volume of the capacitor body enhances a usable area of the capacitor but increases a physical volume thereof, thereby hampering miniaturization of the capacitor.

SUMMARY OF THE INVENTION

An aspect of the present invention provides a tantalum capacitor capable of enhancing a usable area without increase in an overall volume and increasing bonding strength between a capacitor body and a tantalum wire.

According to an aspect of the present invention, there is provided a tantalum capacitor including: a capacitor body containing a tantalum powder and having a mounting surface; a cathode lead frame having the capacitor body mounted thereon; a tantalum wire having an insertion portion located inside the capacitor body and a non-insertion portion located outside the capacitor body; an anode lead frame connected to the non-insertion portion of the tantalum wire; and a resin mold surrounding the capacitor body and the tantalum wire, wherein the insertion portion of the tantalum wire has at least one bending.

The insertion portion of the tantalum wire may have at least one of both surfaces pressurized.

The non-insertion portion of the tantalum wire may have one side disposed coplanar with a bottom of the capacitor body.

The insertion portion of the tantalum wire may be oriented toward a center of the capacitor body.

The insertion portion of the tantalum wire may be bent twice perpendicular to a length direction thereof.

According to another aspect of the present invention, there is provided a tantalum capacitor including: a capacitor body containing a tantalum powder and having a mounting surface; a cathode lead frame having the capacitor body mounted thereon; a tantalum wire having an insertion portion located inside the capacitor body and a non-insertion portion located outside the capacitor body; an anode lead frame connected to the non-insertion portion of the tantalum wire; and a resin mold surrounding the capacitor body and the tantalum wire, wherein the non-insertion portion of the tantalum wire has a thickness greater than a thickness of the insertion portion.

The non-insertion portion of the tantalum wire may have one side disposed coplanar with a bottom of the capacitor body. The non-insertion portion of the tantalum wire may have one side disposed lower than a bottom of the capacitor body.

The insertion portion of the tantalum wire may have at least one bending.

The insertion portion of the tantalum wire may be bent toward a center of the capacitor body.

The insertion portion of the tantalum wire may be bent twice perpendicular to a length direction thereof.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings.

Figure 2A:
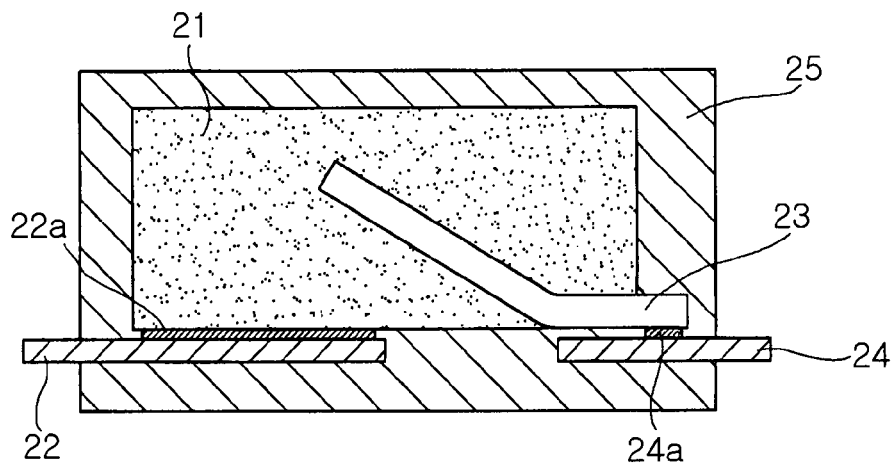
FIGS. 2A through 2C are a front view, a plan view and a side view illustrating an internal structure of a tantalum capacitor, respectively, according to an exemplary embodiment of the invention.
Figure 2B:
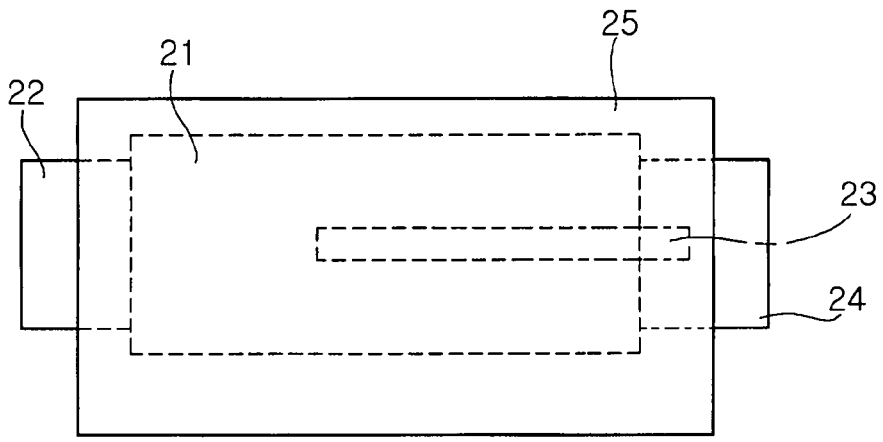
Figure 2C:
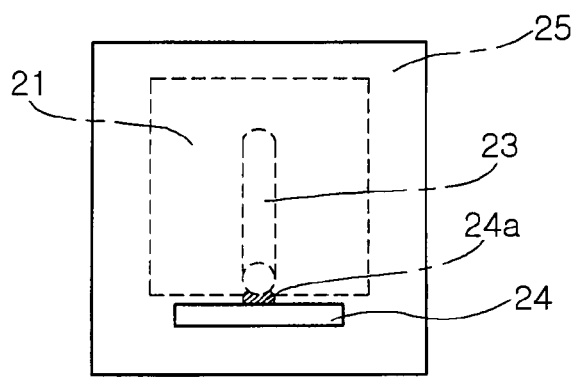

FIGS. 2A to 2C are a front view, a plan view and a side view illustrating an internal structure of a tantalum capacitor, respectively, according to an exemplary embodiment of the invention.

Referring to FIGS. 2A to 2C, the tantalum capacitor of the present embodiment includes a rectangular parallelepiped tantalum capacitor body 21, a tantalum wire 23 partially inserted into the capacitor body, a cathode lead frame 22 connected to the capacitor body 21, an anode lead frame 24 connected to the tantalum wire 23, and a resin mold 25 surrounding the capacitor body 21 and the tantalum wire 23.

To manufacture the capacitor body 21, a tantalum wire is inserted in tantalum powder mixed with a binder to form a tantalum structure of a desired size. Then, the tantalum structure is sintered for 30 minutes at a high vacuum atmosphere ($10^{-5}$ torr or less) of 1200 to 2000° C. to form a tantalum pellet and a conversion coating is formed on a surface of the tantalum pellet by anode oxidization and then sintered. Carbon and silver are applied on a surface of the capacitor body.

Carbon is applied on the surface of the capacitor body to reduce contact resistance of a surface of $MnO_2$. Also, silver is applied to derive a minus polarity.

The capacitor body 21 is bonded to the linear cathode lead frame 22 by a silver adhesive 22a.

The tantalum wire 23 has an insertion portion inserted into the capacitor body 21 and a non-insertion portion formed outside the capacitor body 21.

The insertion portion of the tantalum wire 23 inserted into the capacitor body 21 has one bending. With this bending, the insertion portion of the tantalum wire, when inserted into the capacitor body, is solidly attached to the capacitor body. According to the present embodiment, the tantalum wire is bent once at an acute angle with respect to a bottom of the capacitor body and accordingly the bending may be inserted into the capacitor body to be located adjacent to the surface of the capacitor body.

Furthermore, unlike the prior art, the bending of the tantalum wire is located inside the capacitor body to reduce a length of the non-insertion portion, thereby increasing a volume of the capacitor body. A larger volume of the capacitor body increases a usable area of the capacitor.

The non-insertion portion formed outside the capacitor body 21 is connected to the anode lead frame 24. According to the present embodiment, the non-insertion portion formed outside the capacitor body 21 is disposed coplanar with the bottom of the capacitor body 21 to come in direct contact with the anode lead frame 24. This allows the tantalum wire 23 and the anode lead frame 24 to be directly welded together. Here, the welding may be performed using, e.g., a silver adhesive and a conductive paste.

According to Inventive Example, a capacitor package was manufactured, in which a capacitor body was shaped as a rectangular parallelepiped with a length, width and height of 0.73×0.50×0.38 mm, and accordingly a volume of 0.1387 mm³. The tantalum wire had a thickness of 0.15 mm. The capacitor package including a resin mold had a size of 1.15× 0.65×0.55 mm, and a non-insertion portion formed outside the capacitor body had a length of 0.30 mm. The capacitor body of Inventive Example exhibited a usable area ratio of 33.75% and a maximum capacitance of 10 μF at 6V.

Figure 1A:
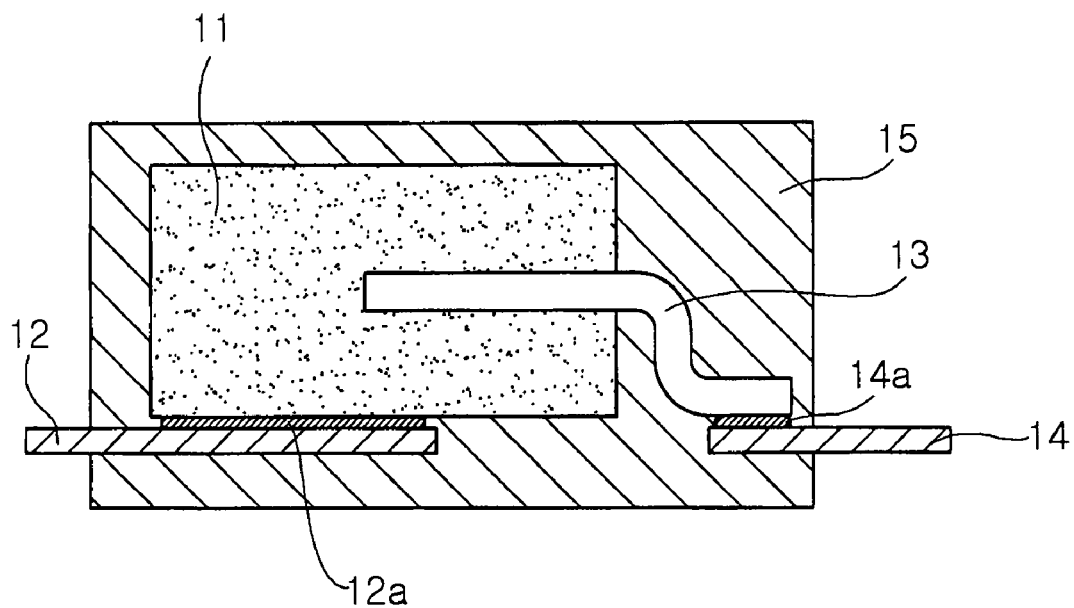
FIGS. 1A and 1B are a front view and a plan view illustrating an internal structure of a conventional tantalum capacitor, respectively.
Figure 1B:
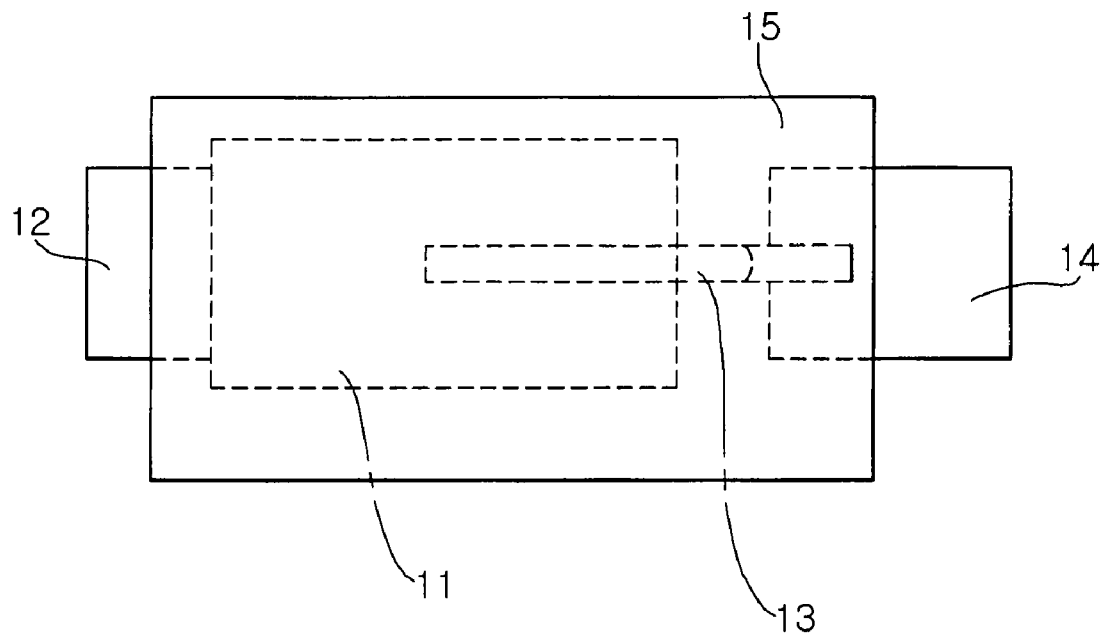

Meanwhile, according to Comparative Example of FIG. 1, a capacitor package was manufactured, in which a tantalum wire inserted into a capacitor body formed inside a resin mold was bent outside the capacitor body. In this structure where the tantalum wire was bent outside the capacitor body while an overall package size was maintained, the capacitor body was formed in a less area, i.e., an area excluding a portion for bending.

According to Comparative Example, the capacitor package including the resin mold had a size of 1.15×0.65×0.55 mm, and the capacitor body formed inside the resin mold had a size of 0.55×0.50×0.38 mm, and accordingly a volume of 0.1045 mm³. A non-insertion portion located outside the capacitor body had a length of 0.48 mm. The capacitor body demonstrated a usable area ratio of 25.43% and a maximum capacitance of 6.8 μF at 6V.

Therefore, when Comparative Example and Inventive Example were compared together, the capacitor packages including the resin mold were found identically sized. However, the capacitor body in the capacitor package of Inventive Example was increased in volume and accordingly in a usable area ratio.

Figure 3A:
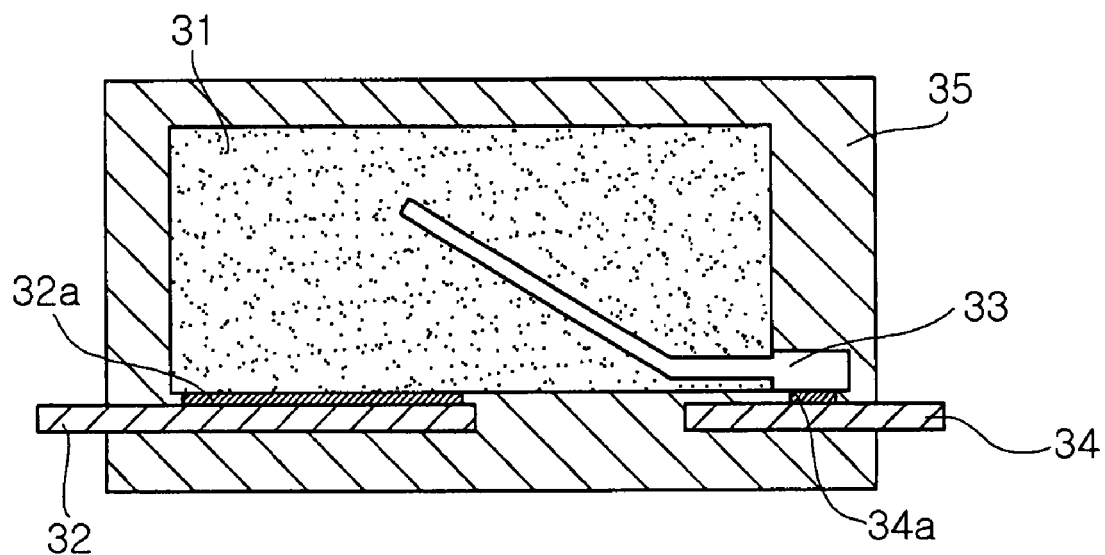
FIGS. 3A and 3B are a front view and a side view illustrating an internal structure of a tantalum capacitor, respectively, according to another exemplary embodiment of the invention.
Figure 3B:
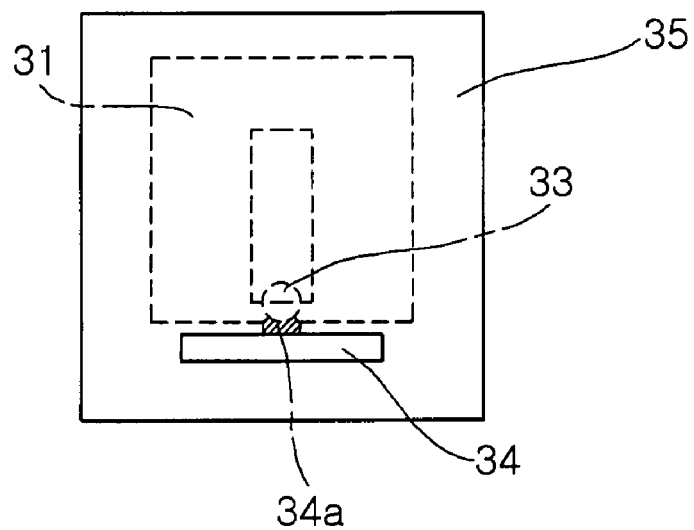

FIGS. 3A and 3B are a front view and a side view illustrating a tantalum capacitor according to another exemplary embodiment of the invention.

Referring to FIGS. 3A and 3B, an insertion portion of the tantalum wire 33 inserted into the capacitor body 31 is pressurized at both surfaces.

Due to this pressurization, as shown in FIG. 3A, the insertion portion of the tantalum wire inserted into the capacitor body 31 has a thickness smaller than a non-insertion portion of the tantalum wire located outside the capacitor body 31. On the other hand, as shown in FIG. 3B, the pressurized insertion portion of the tantalum wire has a width greater than the unpressurized non-insertion portion of the tantalum wire.

The pressurization alters an external shape of the tantalum wire 33 however without changing an overall volume thereof. This as a result increases a usable area ratio of the capacitor as shown in a structure of FIG. 2.

According to the present embodiment, the insertion portion inserted into the capacitor body, when pressurized, has a thickness difference from the non-insertion portion of the tantalum wire located outside the capacitor body. Therefore, with this thickness difference, the non-insertion portion of the tantalum wire located outside the capacitor body may easily have a side disposed coplanar with or lower than a bottom of the capacitor body. Also, when the tantalum wire is brought in contact with the anode lead frame 34, the insertion portion of the tantalum wire inserted into the capacitor body is minimally affected by the contact.

To achieve effects as described above, in place of pressurization of the insertion portion of the tantalum wire, the insertion portion and non-insertion portion of the tantalum wire may be formed to have a different thickness.

Here, the non-insertion portion formed outside the tantalum wire may have a thickness greater than a thickness of the insertion portion. With this structure, the insertion portion inserted into the capacitor body may be spaced apart from the bottom of the capacitor body, without bending, and a side of the non-insertion portion may be brought into contact with the anode lead frame.

As set forth above, according to exemplary embodiments of the invention, a capacitor body in a tantalum capacitor is increased in size while the tantalum capacitor is not altered in an external structure and size. This as a result produces the tantalum capacitor with a greater usable area ratio than a conventional capacitor.

While the present invention has been shown and described in connection with the exemplary embodiments, it will be apparent to those skilled in the art that modifications and variations can be made without departing from the spirit and scope of the invention as defined by the appended claims.

What is claimed is:

1. A tantalum capacitor comprising:
   a capacitor body containing a tantalum powder and having a mounting surface;
   a cathode lead frame having the capacitor body mounted thereon;
   a tantalum wire having an insertion portion located inside the capacitor body and a non-insertion portion located outside the capacitor body;
   an anode lead frame connected to the non-insertion portion of the tantalum wire; and
   a resin mold surrounding the capacitor body and the tantalum wire,
   wherein the insertion portion of the tantalum wire has at least one bending,
   wherein the non-insertion portion of the tantalum wire has one side disposed coplanar with a bottom of the capacitor body.

2. The tantalum capacitor of claim 1, wherein the insertion portion of the tantalum wire has at least one of both surfaces pressurized.

3. The tantalum capacitor of claim 1, wherein the insertion portion of the tantalum wire is oriented toward a center of the capacitor body.

4. The tantalum capacitor of claim 1, wherein the insertion portion of the tantalum wire is bent twice perpendicular to a length direction thereof.

5. A tantalum capacitor comprising:
   a capacitor body containing a tantalum powder and having a mounting surface;
   a cathode lead frame having the capacitor body mounted thereon;
   a tantalum wire having an insertion portion located inside the capacitor body and a non-insertion portion located outside the capacitor body;
   an anode lead frame connected to the non-insertion portion of the tantalum wire; and
   a resin mold surrounding the capacitor body and the tantalum wire,
   wherein the insertion portion of the tantalum wire has at least one bending,
   wherein the insertion portion of the tantalum wire is bent twice perpendicular to a length direction thereof.

6. The tantalum capacitor of claim 5, wherein the insertion portion of the tantalum wire has at least one of both surfaces pressurized.

7. The tantalum capacitor of claim 5, wherein the non-insertion portion of the tantalum wire has one side disposed coplanar with a bottom of the capacitor body.

8. The tantalum capacitor of claim 5, wherein the insertion portion of the tantalum wire is oriented toward a center of the capacitor body.

9. A tantalum capacitor comprising:
   a capacitor body containing a tantalum powder and having a mounting surface;
   a cathode lead frame having the capacitor body mounted thereon;
   a tantalum wire having an insertion portion located inside the capacitor body and a non-insertion portion located outside the capacitor body;
   an anode lead frame connected to the non-insertion portion of the tantalum wire; and
   a resin mold surrounding the capacitor body and the tantalum wire,
   wherein the non-insertion portion of the tantalum wire has a thickness greater than a thickness of the insertion portion,
   wherein the non-insertion portion of the tantalum wire has one side disposed coplanar with a bottom of the capacitor body.

10. The tantalum capacitor of claim 9, wherein the non-insertion portion of the tantalum wire has one side disposed lower than a bottom of the capacitor body.

11. The tantalum capacitor of claim 9, wherein the insertion portion of the tantalum wire has at least one bending.

12. The tantalum capacitor of claim 9, wherein the insertion portion of the tantalum wire is bent toward a center of the capacitor body.

13. The tantalum capacitor of claim 9, wherein the insertion portion of the tantalum wire is bent twice perpendicular to a length direction thereof.

* * * * *